(12) United States Patent
Tsunashima et al.

(10) Patent No.: US 11,792,755 B2
(45) Date of Patent: Oct. 17, 2023

(54) TIME SYNCHRONIZATION IN WIRELESS NETWORKS

(71) Applicant: Cypress Semiconductor Corporation, San Jose, CA (US)

(72) Inventors: Nobuaki Tsunashima, Osaka (JP); Shuji Kumise, Tokyo (JP); James Wihardja, Tustin, CA (US); Victor Zhodzishsky, Potomac, MD (US)

(73) Assignee: Cypress Semiconductor Corporation, San Jose, CA (US)

( * ) Notice: Subject to any disclaimer, the term of this patent is extended or adjusted under 35 U.S.C. 154(b) by 251 days.

(21) Appl. No.: 17/389,625

(22) Filed: Jul. 30, 2021

(65) Prior Publication Data

US 2022/0322253 A1 Oct. 6, 2022

Related U.S. Application Data

(60) Provisional application No. 63/170,339, filed on Apr. 2, 2021.

(51) Int. Cl.
*H04W 56/00* (2009.01)
*H04W 4/80* (2018.01)
*H04W 76/15* (2018.01)

(52) U.S. Cl.
CPC ........... *H04W 56/001* (2013.01); *H04W 4/80* (2018.02); *H04W 76/15* (2018.02)

(58) Field of Classification Search
CPC ...... H04W 56/001; H04W 76/15; H04W 4/80
See application file for complete search history.

(56) References Cited

U.S. PATENT DOCUMENTS

| | | | |
|---|---|---|---|
| 2015/0092642 A1* | 4/2015 | Geboff | H04L 69/329 370/350 |
| 2016/0183205 A1* | 6/2016 | Li | H04W 56/001 370/350 |
| 2017/0034647 A1* | 2/2017 | Takeuchi | H04W 76/15 |
| 2019/0132436 A1* | 5/2019 | Jang | H04M 1/72415 |
| 2020/0137699 A1* | 4/2020 | Girardier | H04W 4/80 |
| 2021/0266102 A1* | 8/2021 | Ferrari | H04W 12/106 |

* cited by examiner

*Primary Examiner* — David Bilodeau

(74) *Attorney, Agent, or Firm* — Lowenstein Sandler LLP

(57) ABSTRACT

Implementations disclosed describe numerous techniques and systems facilitating synchronous actions in wireless networks that have a central device (CD) and multiple peripheral devices (PDs) communicating wirelessly with the CD. The CD communicates one or more messages to the PDs and various PDs determine, using communicated messages, a time of a synchronous action to be performed by the PDs. The synchronous action includes an interaction of a respective PD with one or more associated devices communicatively coupled with the PD. Upon completion of the synchronous action, the PDs may transmit data generated by the PDs, or by the one or more associated devices, in connection with the synchronous action.

24 Claims, 11 Drawing Sheets

TIME SYNCHRONIZATION IN WIRELESS NETWORKS

RELATED APPLICATIONS

This application claims the benefit of U.S. Provisional Application No. 63/170,339, filed Apr. 2, 2021, the entire contents of which are being incorporated herein by reference.

TECHNICAL FIELD

The present disclosure pertains to wireless networks; more specifically, to time synchronization of various electronic devices communicating wirelessly, e.g., via a Bluetooth or Bluetooth Low Energy (BLE) connection.

BACKGROUND

Personal area networks, such as Bluetooth (BT), use the 2.4 GHz radio frequency band to provide wireless connection for various personal industrial, scientific, and medical applications. BT networks use a packet-based protocol and have an architecture that includes central devices (CDs) and peripheral devices (PDs). A CD can communicate with multiple PDs. Typically, data is transferred between a CD and a specific PD during a time allocated for the specific PD-CD communication link. At a designated time, a PD can tune-in to receive messages and data from the CD and, in turn, communicate data to the CD. Additionally, a CD can sometimes use a broadcast mode, in which the same data is communicated to multiple PDs simultaneously. Bluetooth Low Energy (BLE) networks have communication ranges that are similar to that of BT networks but have a considerably smaller power consumption and cost. BLE devices often remain in a sleep mode and transition to an active mode when data communication is about to happen. BLE protocol also supports mesh networking, in which data can flow over multiple paths, and which does not rely on a rigid hierarchical structure of devices, often allowing the same devices to serve as CDs or PDs, depending on particular network conditions and topology.

BRIEF DESCRIPTION OF THE DRAWINGS

FIG. 6A illustrates a triggering scheme that uses a hardware interrupt. FIG. 6B illustrates a triggering scheme that uses a firmware or a software interrupt.

DETAILED DESCRIPTION

Figure 1:
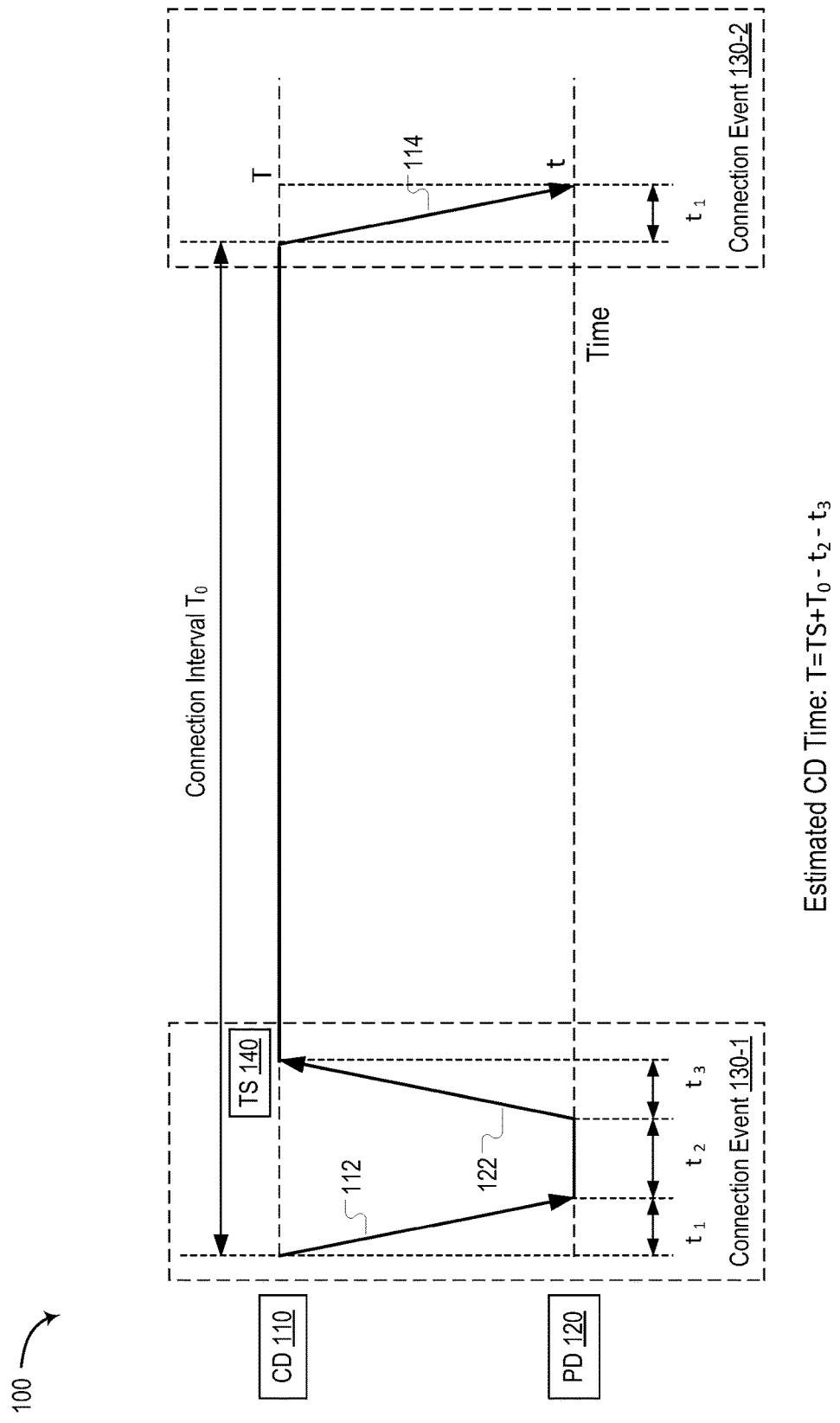
FIG. 1 illustrates an example clock synchronization in wireless networks using a time stamp generated by a central device and a known duration of a connection time interval, in accordance with some implementations.

In many personal, industrial, scientific, and medical applications, time synchronization of separate devices may provide significant benefits. Under time-varying conditions, there may be an advantage of performing a measurement or initiating some other action by multiple devices simultaneously. For example, performance of electric vehicles may depend on uniformity of charging and discharging of multiple high-voltage battery cells. Accurate synchronous (simultaneous) measurements of the state of each cell may provide data that can be used to optimize battery utilization during acceleration, cruising, braking, and various other maneuvers of the vehicle, as well as data during charging. Similarly, medical devices may be configured to collect simultaneous data from multiple parts of the patient's body. Industrial testing (e.g., crash testing of a car or any other safety-sensitive equipment) may rely on synchronization of measurements by multiple sensors. Such a synchronization is typically achieved through a wired connection, which can be used to ensure that all signals are generated, sent and/or, received simultaneously. Wired connections, however, may be cumbersome to install and maintain, especially where a large number of miniature devices are integrated and used as a part of a larger system. In some instances, wired connections to a large number of peripheral devices may not only be inconvenient but may be impractical or even unsafe. Therefore, it may be advantageous to deploy wireless sensors/devices that are easier to install, maintain, or replace than wired devices.

Wireless devices, being largely independent from each other, may have clocks that run with somewhat different speeds compared with other clocks; e.g., different clocks may have a slightly different drift, jitter, etc. It would thus be beneficial to synchronize all or at least some of the wireless devices. For example, devices operated using a BT, BLE, or some other wireless network technology, could be synchronized by a suitably prepared signals exchanged between a central device (CD) and various peripheral devices (PDs).

Existing methods of time synchronization include a PD sending, at a first recorded time $t_a$, a request for a time stamp to the CD. The CD receives the request, generates a Real Time Clock (RTC) time stamp TS, and sends TS back to the PD. The PD receives this response at a second time $t_b$, records this time, and estimates that the master time stamp TS was generated at a halfway time $(t_a+t_b)/2$ between the two recorded times. The PD then uses this information to record an estimated mismatch between the two clocks, $\Delta=(t_a+t_b)/2-TS$. This estimated mismatch can subsequently be used for future synchronization actions. For example, when the PD is instructed by the CD to perform a certain action at time T' (according to the clock of the CD), the PD can add the mismatch to the specified time to determine that the action is to be performed at the time $t'=T'+\Delta$ (by the clock of the PD).

The implied assumption of this method is that the time interval between sending the request for the time stamp and generating the RTC time stamp by the CD is equal to the time interval between generating the RTC time stamp by the CD and receiving the RTC time stamp by the PD. Because the exact time for transmission and processing of data is subject to various uncertainties (e.g., due to signal obstruction, network interference and noise, etc.), such an assumption may not always be accurate. For example, sometimes transmission from the CD to the PD can take longer than in the opposite direction (or vice versa). On the other hand, requesting multiple RTC time stamps over a period of time and computing an average clock mismatch can take a significant time that may be too long (and potentially suffer from an additional clock drift over longer times).

Aspects and implementations of the present disclosure address these and other limitations of the existing technology by enabling systems and methods of efficient and accurate clock synchronization in wireless networks (e.g., for performance of synchronous actions). In one example implementation, a CD and a PD may communicate once every connection interval $T_0$; the PD may send a time stamp request at the onset of a connection event to the CD and the CD may record the CD's time stamp TS right after receiving the request. The CD may then wait until the next connection event to communicate the recorded time stamp to the PD. As described in more detail below, the PD may infer the clock mismatch $\Delta$ based on the time stamp time TS and the duration of the connection interval $T_0$. Once the mismatch $\Delta$ has been determined by various PDs, the CD may send instructions with a time of a synchronous action, and multiple PDs may be capable of performing this action synchronously, using the determined mismatches. In another example implementation, the CD may not be communicating the time stamps to the PD. Instead, during initial establishment of the wireless connection between the CD and various PDs, the CD may allocate, to each PD, a connection slot (within the connection interval $T_0$) individually offset from the start of the connection interval. The individual offsets may be known to an application (installed on the CD) that schedules a synchronous action. The application may set a target time for the synchronous action and may communicate, to each PD, during a connection slot allocated to the respective PD, a time that remains until the target time. Using the communicated times, various PDs may be capable of starting the execution of the synchronous action at the same target time. In some implementations, the CD may use advertising broadcasts to communicate the target time for the synchronous action to multiple PDs at the same time. Numerous other implementations and multiple variations of these implementations are discussed below. Where convenient, features that perform similar roles in different figures are given similar labels (that differ by the first digit), e.g. CD 110, CD 210, and CD 310 in FIGS. 1, 2, and 3.

FIG. 1 illustrates an example clock synchronization 100 in wireless networks using a time stamp generated by a central device and a known duration of a connection time interval, in accordance with some implementations. Depicted schematically in FIG. 1 are operations of a central device (CD) 110 and a peripheral device (PD) 120. CD 110 and PD 120 may be a part of a Bluetooth (BT) network, a BT Low Energy (BLE) network, or any other wireless network. CD 110 and PD 120 may have previously established a wireless network connection. Although depicted in FIG. 1, for brevity and conciseness, is a single PD 120, CD 110 may be concurrently supporting connections with multiple PDs. Various devices depicted in FIG. 1 may be communicatively coupled (e.g., via a wired connection, a bus, or wirelessly) with one or more associated devices. In some implementations, PD 120 (and, in some instances, CD 110) may be monitoring a state of the associated device(s) or facilitating operations of the associated device(s). For example, PD 120 (and/or various other PDs that are not shown in FIG. 1) may be associated with one or more cells of a battery (e.g., an automotive battery of an electric vehicle) and may be performing (or facilitating) measurements of a state of the cells of the battery. The measurements may be performed periodically or at times determined by a host controller communicatively coupled to CD 110. PD 120 (and/or various other PDs) may be integrated into a battery pack. The battery may be used to power an electric motor that propels an electric vehicle. As the battery is powering the motor, battery cells may be in a constant state of discharging (and/or charging, e.g., during braking), which may occur differently in different cells. To perform a meaningful and accurate measurements of the state of various cells, various PDs of the wireless network may perform the measurements (or cause the measurements to be performed by associated sensors coupled to the cells) synchronously.

In some implementations, synchronous actions by the PDs are enabled by allowing various devices of the wireless network to determine the difference of their internal clocks with at least one other reference device in the network, e.g., CD 110. The determined clock differences may be used to perform synchronous actions simultaneously on multiple devices. In some implementations, clock synchronization 100 may be facilitated by the specification of a wireless protocol of the CD-PD connection. For example, as may be set by CD 110 during initial establishment of a connection between CD 110 and PD 120, connection events 130-1 and 130-2 may be spaced by a connection interval $T_0$. In the description of FIG. 1 that follows, the reading of the internal clock (e.g., the RTC) of CD 110 is denoted with uppercase T, with various subscripts (as may be used), and the reading of the internal clock of PD 120 is denoted with lowercase t, likewise with various subscripts.

In some implementations, clock synchronization 100 may be achieved as follows. CD 110 may send, at an onset of connection event 130-1, a message 112 to PD 120. Message 112 may include one or more data packets, frames, such as management frames, control frames, and the like. In some implementations, message 112 may be an empty message that includes a header but no data frame. Responsive to receiving message 112, PD 120 may generate a request 122 for a time stamp TS from the RTC of the CD 110 and transmit the generated request to CD 110. Although delivery of message 112 to PD 120, generation of request 122 by PD 120, and transmission of request 122 to CD 110 may be performed over times that are substantially smaller than the duration of the connection interval $T_0$, some delays may be associated with such processes. For example, it may take time $t_1$ for message 112 to be transmitted from CD 110 to PD 120 and be processed by PD 120 (e.g., by PHY Layer and Link Layer of PD 120). It may further take time $t_2$ for PD 120 to generate request 122, transform request 122 into one or more frames, to generate data packet(s) based on the frame(s), and transmit the data packet(s) to CD 110. Additionally, it may take time $t_3$ for request 122 to be received and processed by CD 110.

Upon receiving request 122 from PD 120, CD 110 generates a time stamp 140. The generated time stamp 140 may include current value TS of the RTC of CD 110 at the time when the time stamp 140 is generated. When the next connection event 130-2 occurs, CD 110 may send the generated time stamp 140 to PD 120 in message 114. It may again (as in case of earlier message 112) take time $t_1$ for message 114 to be received by PD 120.

To perform clock synchronization, PD 120 may record its own time t at the time of arrival of message 114 (with the time stamp 140) and perform a comparison, in view of the connection interval, between the value TS of time stamp 140 received from CD 110 and a current value of clock (e.g., RTC) of PD 120. In some implementations, this comparison may be performed as follows. A processing device of PD 120 may infer the current value T of the clock of CD at the time at which PD 120 generated time stamp t in response to receiving message 114. In some implementations, the processing device of PD 120 may infer the current value T as the sum of the time stamp 140 value TS and the duration of the connection interval, $T=TS+T_0$. In some implementations, the processing device of PD 120 may further correct for the time it takes the request 122 to be generated by PD 120, transmitted, and processed by CD 110, and infer the time as, e.g., $T=TS+T_0-t_2-t_3$.

It should be understood that the above formulas are intended as examples and that various other schemes of clock synchronization are possible that are based on the duration of the connection interval, e.g., using different specific equations, accounting for different (or additional) corrections, while still being within the scope of this disclosure.

Having inferred the current clock value T of CD 110, the processing device of PD 120 may then calculate a clock difference (mismatch, offset, etc.), $\Delta=t-T$, and use this clock difference in order to perform various synchronous actions, as may be instructed by CD 110 or scheduled by software or firmware operating on PD 120. Such instructions may be received as part of message 112, message 114, or any other (previous or later) messages communicated by CD 110. Having received an instruction to perform a synchronous action at time T', PD 120 may add the determined clock difference $\Delta$ and identify the accurate time $t'=T'+\Delta$ to perform (or start) the action.

In some implementations, the actors shown in FIG. 1 may be reversed, i.e. CD 110 may send a request (e.g., as part of message 112) to PD 120 for a time stamp, and upon receiving the time stamp from PD 120, the CD 110 may perform calculations (similar to the ones described above) to determine the clock difference $\Delta$ between the two devices. Subsequently, when CD 110 generates instructions for PD 120 to perform an action (e.g., synchronously with other PDs of the wireless network), CD 110 may include in the instructions the time of the action that has been corrected in view of the difference $\Delta$. In some implementations there may be a logic unit on PD 120 to detect if a data packet was missed, for example if a time greater than the connection interval $T_0$ (or twice the connection interval $2T_0$, etc.) has passed between PD 110 generating a request 112 and receiving a time stamp 140, and trigger an additional request to CD 110 for a new time stamp. In some implementations, for additional accuracy, the process may be repeated several times and a statistical metric may be used to correct for clock differences, for example, by computing the mean or the mode of the calculated differences $\Delta$.

Figure 2:
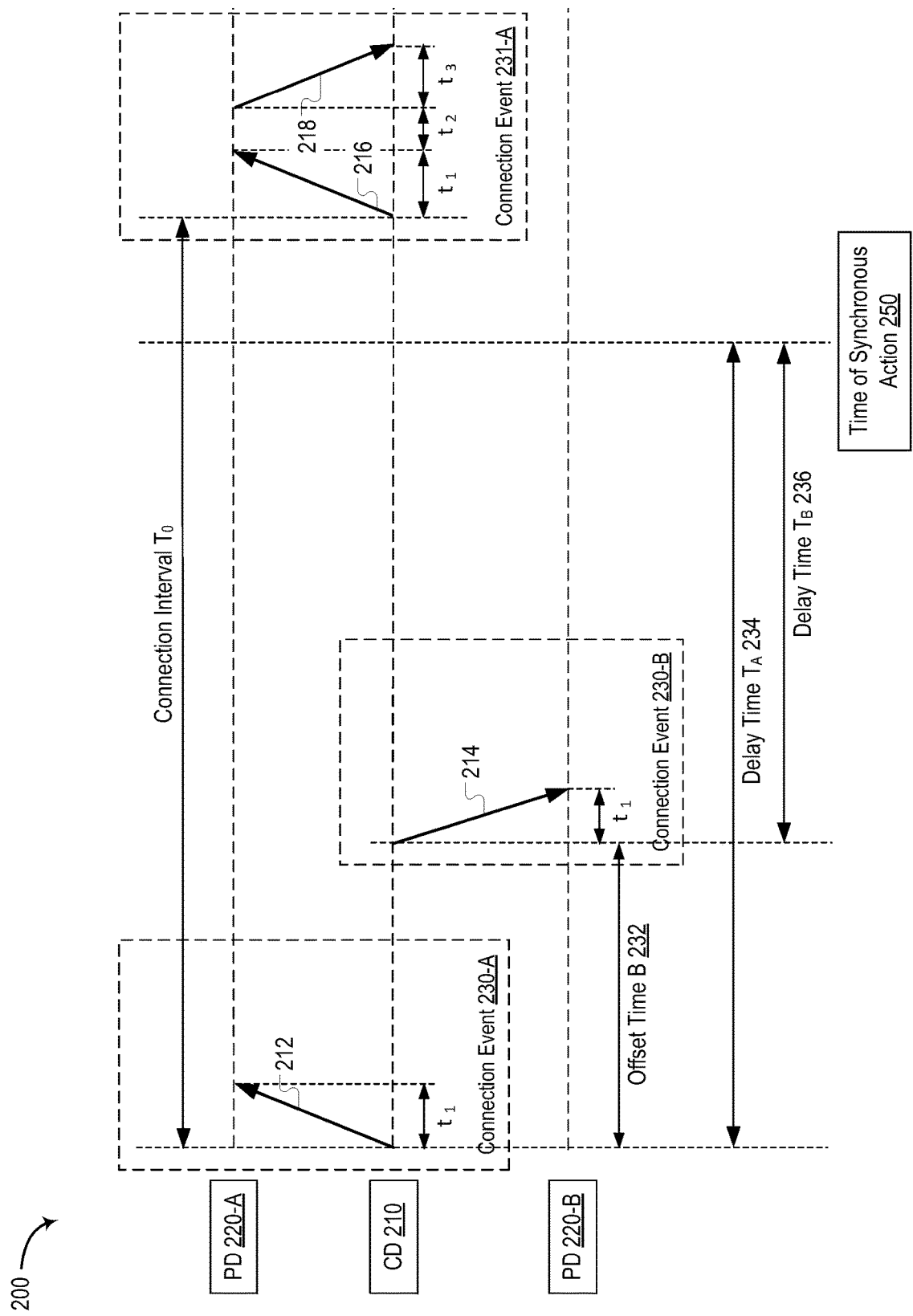
FIG. 2 illustrates an example process of performing a synchronous action in wireless networks using scheduled connection events, in accordance with some implementations.

FIG. 2 illustrates an example process 200 of performing a synchronous action in wireless networks using scheduled connection events, in accordance with some implementations. As depicted, clock synchronization may be performed in a system that includes a CD 210 wirelessly connected to multiple PDs 220-X (e.g., PD 220-A, 220-B, etc.), and the CD 210 uses the difference between scheduled communication times with the various PDs 220-X to facilitate a synchronous action at a particular time 250. In FIG. 2, CD 210 schedules times to communicate with each of the various PDs 220-X. Although only two peripheral devices, PD 220-A and PD 220-B are shown for conciseness in FIG. 2, in various implementations the number of peripheral devices need not be limited. In some implementations, the wireless network may be a connected mesh network, such that any device can be designated as the acting CD, and that role can change from device to device over time. Although some information helpful for comprehension of implementations is shown in FIG. 2, it will be understood that other devices, events, and processes not explicitly shown may also be a part of the wireless network and communications thereof, such as other devices associated with (or coupled to) CD 210 or PDs 220-X, wireless communications transmitted by PDs 220-X back to CD 210 during various connection events (e.g., connection events 230-A, 230-B, 231-A, etc.), and the like.

The synchronous action occurring at time 250 may be a measurement of the state of devices associated with the PDs 220-X and/or the CD 210. In one implementation, each PD 220-X is associated with a sensor configured to monitor a cell in the battery of an electric vehicle, or a medical device taking readings from a particular point in the body of a patient, and the like. When the time of synchronous action 250 arrives, some or all devices (e.g., PDs 220-X and/or CD 210) may perform a simultaneous measurement (or any other action), to obtain accurate data characterizing a state of the system being measured (or initiate some other operation).

In some implementations, the synchronous action may instead be a clock synchronization event, wherein all PDs 220-X simultaneously record a RTC time stamp t, compare the recorded time stamp with a time stamp T recorded by CD 210 at the same time and communicated (e.g. broadcasted) to PDs 220-X. Subsequently, PDs 220-X may use the difference $T-t$ of the recorded time stamps in performing future synchronous actions.

In some implementations, CD 210 establishes and programs a communication with a plurality of PDs 220-X. The CD 210 manages the timing of the various connection events 230-X with respective PDs 220-X, for exchanges of data with each PD 220-X every connection interval $T_0$. The CD 210 may, for instance, be in a wireless communication with PD 220-A and PD 220-B. The CD 210 schedules a time to communicate with PD 220-A, and a time to communicate with PD 220-B delayed by offset time B 232.

In one non-limiting example, CD 210 sends a message 212 during (e.g., at the start of) connection event 230-A to PD 220-A. The message 212 may include a delay time $T_A$ 234 until a future time of synchronous action 250. Message 212 may, as discussed above, contain corrections for air time, processing time, etc., such as those captured by $t_1$.

More specifically, the delay time $T_A$ communicated by CD 210 may be reduced by the anticipated correction. For example, a delay time $T_A$-$t_1$ may be communicated to PD 220-A. In some implementations, CD 210 may communicate the intended delay time $T_A$ whereas the correction may be applied by PD 220-A. During connection event 230-B, CD 210 sends another message 214 to PD 220-B, also containing a delay time $T_B$ 236 remaining until the future time of synchronous action 250. Delay time $T_B$ 236 may be chosen in view of the time between connection event 230-A and connection event 230-B, e.g., in view of the time offset B 232.

As depicted in FIG. 2, after the time of synchronous action 250 has passed (and the synchronous action has been performed), CD 210 may communicate again with PD 220-A during one of the subsequent connection events, e.g., connection event 231-A. More specifically, CD 210 may send a new message 216 to PD 220-A, which may contain a new delay time to a second synchronous action (not shown). In addition, PD 220-A may also send data 218 to CD 210. The data may include the results of a measurement conducted by PD 220-A (or a device associated with PD 220-A) in conjunction with the performed synchronous action.

In some implementations, determination of time delays $T_A$ and $T_B$ may be performed by a synchronization application executing on CD 210. The synchronization application may determine the time of synchronous action 250, identify time offsets for various PDs 220-X, generate content of messages 212 and 214, collect data from the PDs generated during or in connection with the synchronous actions, and so on. In some devices and wireless networks (e.g., BT and BLE networks), the synchronization application may have no standard access to time offsets, which can be managed by a lower-level mechanisms (e.g., Link Layer) of CD 210. To address such situations, a change to the communication standard used by CD 210 and PDs 220-X may be made. More specifically, after the Link Layer of CD 210 has determined time offsets for various PDs (e.g., during the time the network connections are established), the Link Layer may allow the synchronization application access to the offsets that have been set up.

Figure 3:
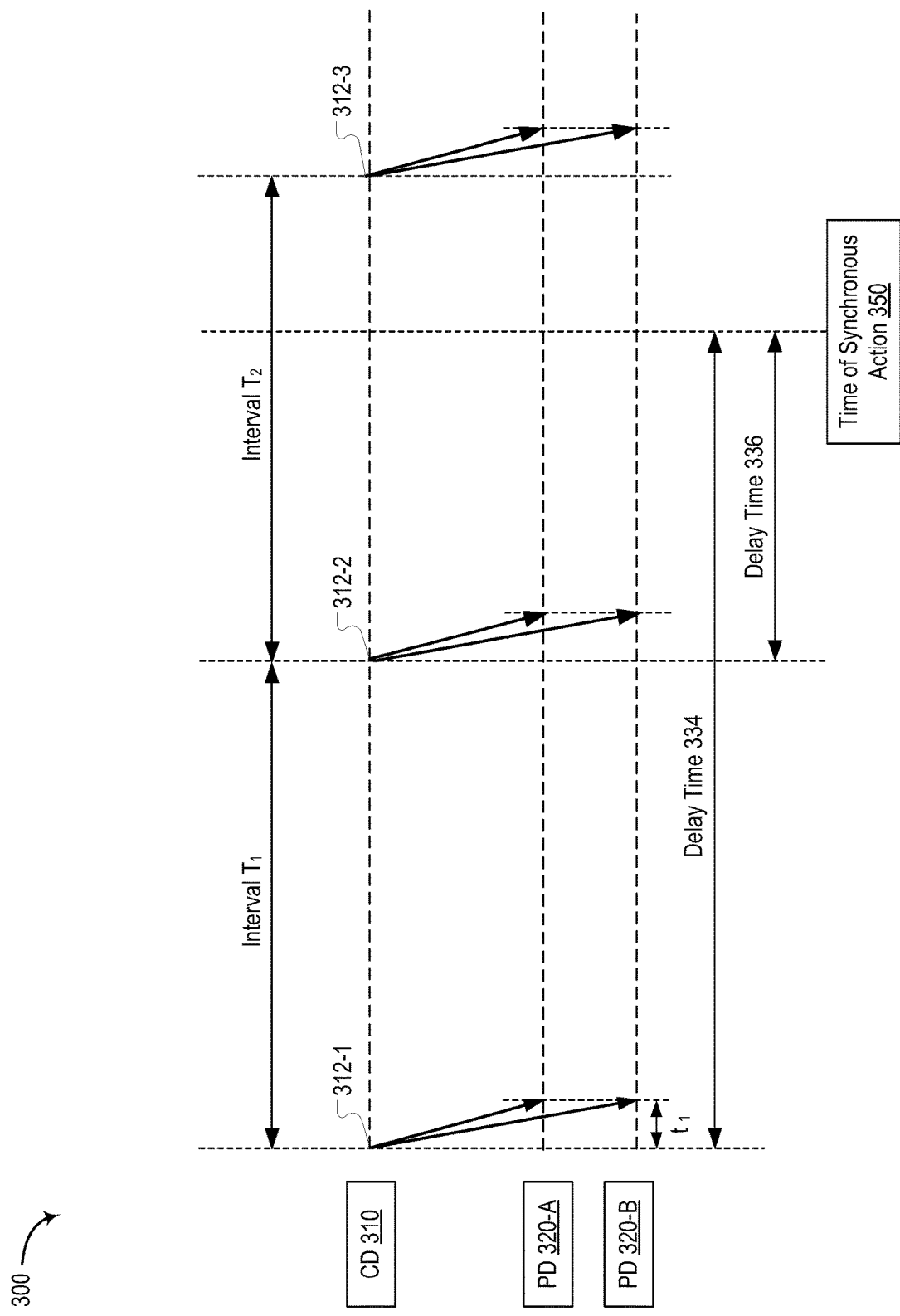
FIG. 3 illustrates an example process of performing a synchronous action in wireless networks using broadcast advertisings, in accordance with some implementations.

FIG. 3 illustrates another example process 300 of performing a synchronous action in wireless networks using broadcast advertisings, in accordance with some implementations. Specifically, CD 310 may broadcast messages 312-X (e.g., 312-1, 312-2, 312-3, etc.) which are received by PDs 320-X. In some implementations, messages 312-X may include BT or BLE advertising packets. Messages 312-X may include data that facilitates a future synchronous action by the devices of the wireless network. In some implementations, to avoid data loss due to radio interference or changing environmental conditions, it may be advantageous for CD 310 to broadcast multiple messages in preparation for a single synchronous action; consecutive broadcasts may be separated by intervals $T_1$ (or, in some implementations, unequal time intervals, $T_1 \neq T_2$). Multiple broadcasts may mitigate a problem of packet loss during transmission or as a result of data reception errors by the PDs 320-X.

In one example implementation, CD 310 broadcasts a message 312-1 to multiple PDs 320-X (although two PDs are depicted in FIG. 3, it will be understood that any number of PDs may be present). Message 312-1 may include information facilitating a synchronous action by at least some of the PDs 320-X at a future time (e.g., a time of synchronous action 350). After a passage of a predetermined time, e.g. interval $T_1$, CD 310 may broadcast a second message 312-2 which may include updated information that further facilitates the synchronous action at future time 350 and is generated in view of the passage of time interval $T_1$. More messages may similarly be broadcast to advertise the time of synchronous action 350, each adjusted in view of the passage of time between broadcast messages.

In one implementation, CD 310 may determine that the synchronous action is to be performed at time $T_{SYNC}$ in the future. CD 310 may broadcast a first advertising message 312-1 that includes a delay time 334 (e.g., $T_{SYNC}$) until the time of synchronous action 350. After passage of time interval $T_1$, CD 310 may broadcast a second advertising message 312-2 that may include the updated delay time 336 (e.g., $T_{SYNC}-T_1$) until the time of synchronous action 350. Similarly, after passage of time interval $T_2$, CD 310 may broadcast a third advertising message 312-3 that may include another updated delay time (e.g., $T_{SYNC}-T_1-T_2$) until the time of synchronous action 350, and so on. In another implementation, messages 312-X may include an event counter and a delay time. Once the target event count is reached, e.g. once a certain number of intervals $T_1$, $T_2$ . . . have passed, PDs 320-X may wait for the passage of a broadcasted delay time and then perform an action at the time of synchronous action 350.

In some implementations, intervals $T_1$, $T_2$ . . . are of the same duration. In such implementations, messages 312-X may be periodic advertisements. Additionally, CD 310 (and/or PDs 320-X) may account for various corrections, such as corrections for communication delay $t_1$. Even though in FIG. 3 communication delay $t_1$ is shown as being the same for PD 320-A as for PD 320-B, this should not be construed as limiting. Distinct and different corrections may be determined (e.g., empirically) for separate PDs 320-X accounting for different locations, environments, processors, functions, etc., of various PDs 320-X. These corrections can take various forms, some of which are described in conjunction with FIG. 1.

Figure 4:
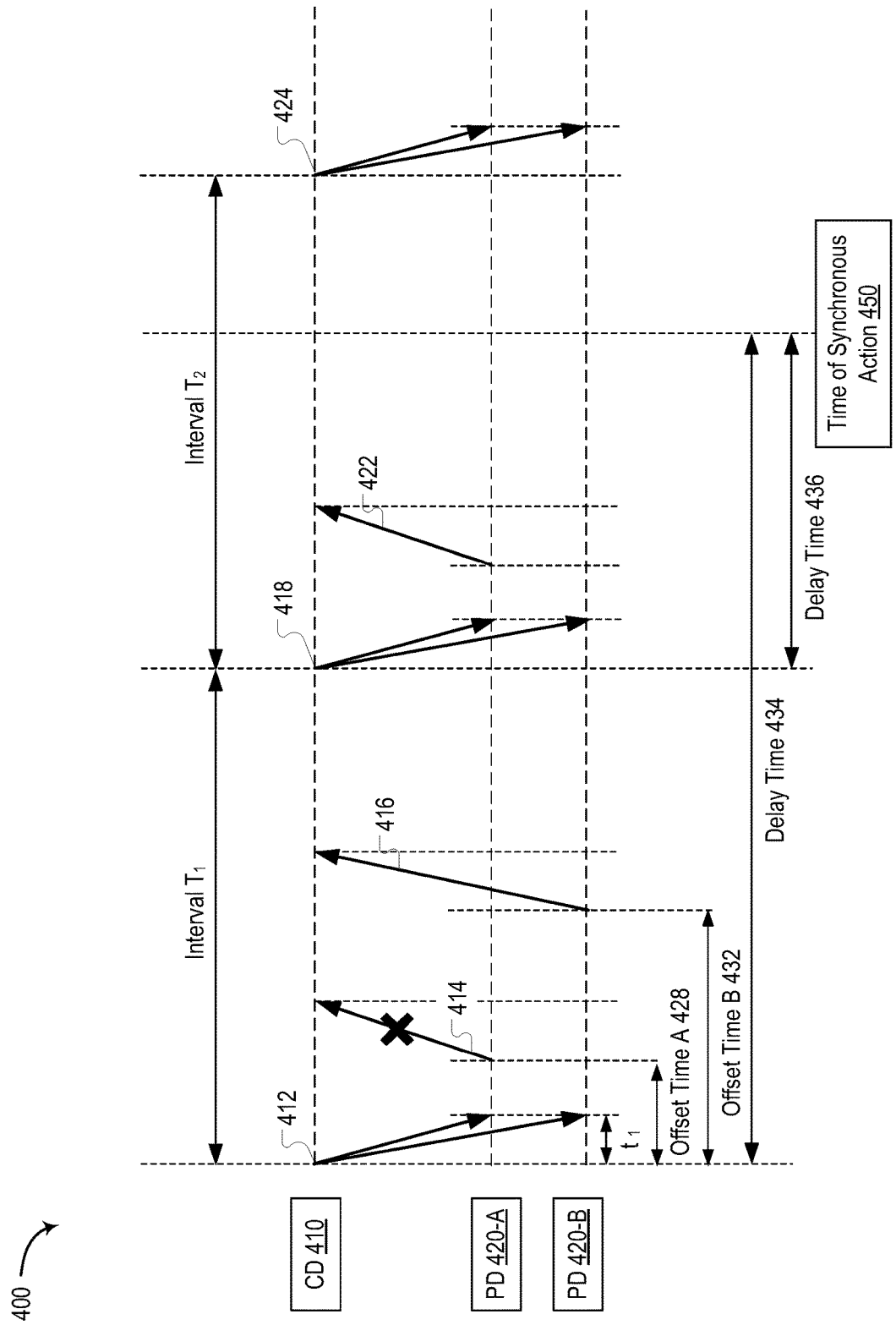
FIG. 4 illustrates an example process for performing a synchronous action in wireless networks using scheduled connection events, with additional protection against packet loss, in accordance with some implementations.

FIG. 4 illustrates an example process 400 for performing a synchronous action in wireless networks using scheduled connection events, with additional protection against packet loss, in accordance with some implementations. It will be understood that while two PDs 420-A and 420-B are depicted in FIG. 4, the number of PDs is not limited. CD 410 may schedule times to send messages to PDs 420-X (e.g., at the beginning of communication intervals $T_1$, $T_2$, etc.), and receive communications from each PD 420-X. In certain wireless networks, e.g. mesh networks, it will be understood that different devices could act as CD 410 at different times. CD 410 may broadcast a message 412 to one or more PDs 420-X (e.g. PD 420-A, PD 420-B, etc.). Message 412 may include an indication of time of a future synchronous event. The indication of time, in some implementations, may be a delay time (e.g., delay time 434) or an event counter and a delay time. Message 412 may also include information, managed by CD 410, indicating a time and channel for each of PDs 420-X to communicate back to CD 410. Depending on network settings (e.g. implemented by CD 410), all PDs 420-X may be scheduled to send data to CD 410 at each communication interval, or only some of PDs 420-X may communicate with the CD 410 in a given communication interval. The indication of time for communication of a specific PD 420-X to CD 410 may be a time offset from the start of a particular communication interval to the time of communication by the PD 420-x, e.g. offset time A 428 for PD 420-A, offset time B 432 for PD 420-B, etc. Delays in communication and processing (such as $t_1$) as well as other possible delays may be taken into account in a variety of ways, as described in conjunction with the above figures.

At their scheduled times, PDs 420-X may communicate messages 414 and 416 to CD 410. Messages 414 and 416 may contain empty packets (header-only packets, for instance), data from a recent (e.g., synchronous) measurement taken by devices associated with PDs 420-X, time stamps, or other information. In some cases, due to interference, noise, obstruction, or because of any other cause, one or more data packets transmitted by any of PDs 420-X may not be received by CD 410, as depicted in FIG. 4 by a cross drawn over message 414 from PD 420-A to CD 410. When CD 410 detects that a scheduled message 414 from PD 420-A has not arrived, CD 410 may broadcast a subsequent message 418, e.g., at the beginning of the next communication interval $T_2$. Message 418 may include similar data as message 412, e.g., an indication of time of a synchronous event 450 (delay time 436) and information facilitating communication of PDs 420-X to CD 410. Message 418 may also include a request that the lost data packet be replaced, e.g. that PD 420-A retransmit a copy of message 414. The contents of message 414 that did not reach CD 410 may then be retransmitted, e.g. PD 420-A may transmit a new message 422 at the communication time scheduled by CD 410, which may includes the data lost in message 414. Implementations such as that depicted in FIG. 4 may be used when reliable data transfer from PDs 420-X to CD 410 is desired, when the wireless network has a substantial amount of noise and/or interference, when some of PD 420-X may be low-power devices, and in other instances.

Figure 5:
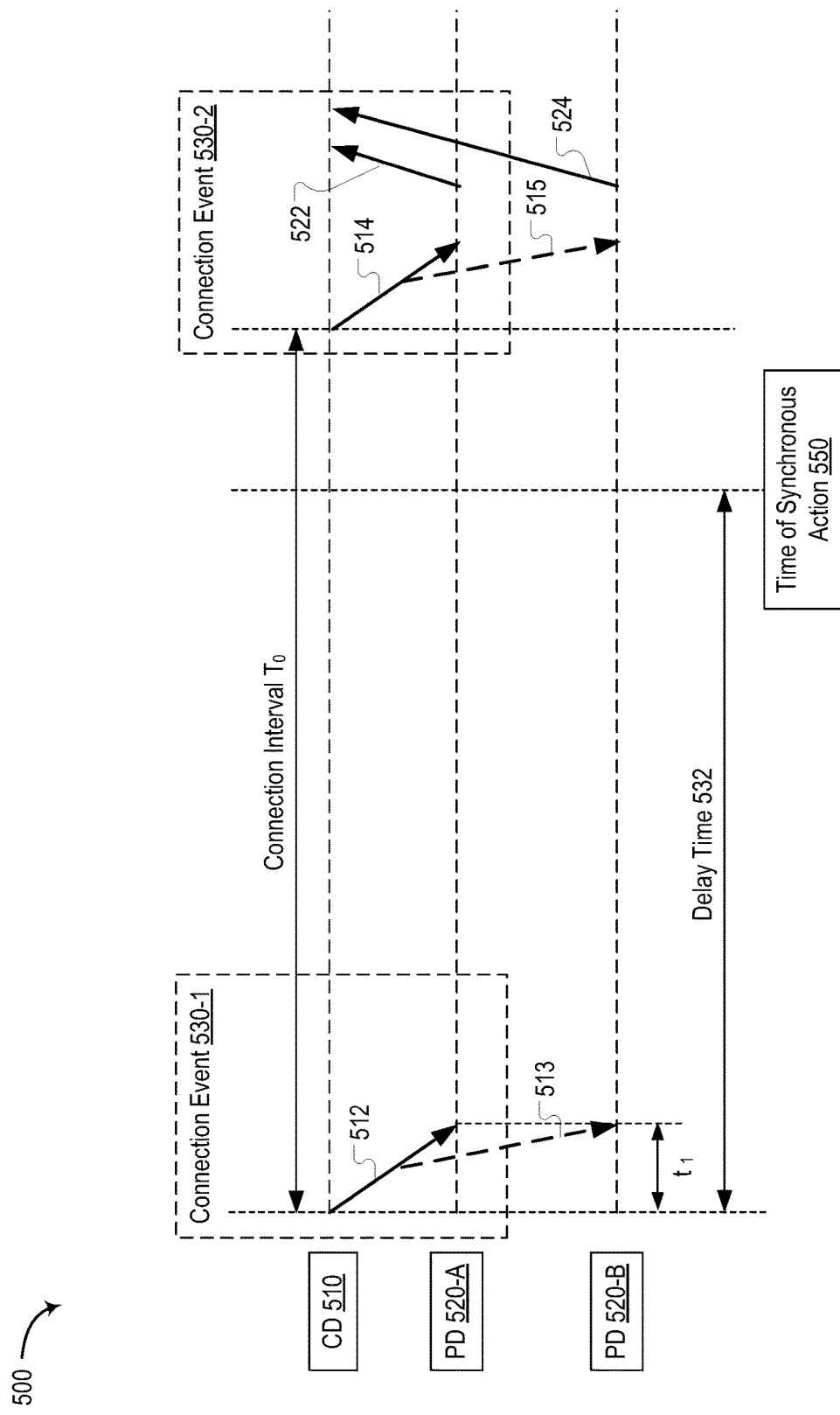
FIG. 5 illustrates an example process for performing synchronous actions in wireless networks while limiting air space usage by utilizing eavesdropping, in accordance with some implementations.

FIG. 5 illustrates an example process 500 for performing synchronous actions in wireless networks while limiting air space usage, by utilizing eavesdropping, in accordance with some implementations. As depicted schematically in FIG. 5, CD 510 may establish a connection with PD 520-A (it will be understood that the number of PDs 520-X is not limited to two). During each connection event 530-1, 530-2, etc., CD 510 may send message 512, 514, etc., to PD 520-A that contains an indication of time of a future synchronous action (e.g. time of synchronous action 550). As detailed above, the indication of time may include a delay time (such as delay time 532), a target clock time, and may further include an event counter, or may represent any other suitable method of facilitating a synchronous action. The synchronous action may include taking a measurement (or instructing an associated device to take a measurement), generating data, such as a time stamp, or performing some other action (such as actuating a switch, manipulating a physical device, etc.).

PD 520-B may eavesdrop on message 512 sent by CD 510 (e.g., as depicted by a dashed arrow 513). This eavesdropping may be facilitated by an earlier (e.g., temporary) wireless connection established between CD 510 and PD 520-B, or an earlier (or current) wireless connection between PD 520-A and PD 520-B, or the like. For example, from an earlier connection with CD 510, PD 520-B may be in possession of authentication information (e.g., name of the wireless network, public/private key used for encryption of communications, and/or other information). In some implementations, PD 520-B may have not previously established a connection with CD 510 and/or PD 520-A and is a passive listener to the communication occurring between CD 510 and PD 520-A. From message 512, eavesdropping PD 520-B may determine the time of synchronous action 550, e.g. based on delay time 532 included in message 512. Subsequently, PD 520-B may perform the synchronous action simultaneously with PD 520-A.

As depicted in FIG. 5, PD 520-A may send a message 522 to CD 510 during a connection event 530-1, e.g., to communicate data generated in connection with the synchronous action. Message 522 may include, for instance, measurement data, an RTC time stamp, and so on. The next connection event 530-2 may occur after connection interval $T_0$, and CD 510 and PD 520-A may again communicate, with PD 520-2 still eavesdropping on the communications (e.g., as depicted by a dashed arrow 515) in order to intercept further instructions about future synchronous events, such as may be included in message 514. In some implementations, PD 520-B may establish an active wireless connection with CD 510 during connection event 530-2 to deliver, to CD 510, message 524 that includes data acquired by PD 520-B in connection with the synchronization event.

In some eavesdropping implementations, CD 510 may change (e.g., periodically, or from time to time) a specific PD with which CD 510 is wirelessly communicating. For example, after a predetermined time, CD 510 may drop a connection with PD 520-A and establish a connection with PD 520-B (with PD 520-A now eavesdropping). In some eavesdropping implementations, CD 510 may maintain connections with a first subset of PDs 520-X while a second subset of PDs 520-X is eavesdropped on the communications of the first subset. In some eavesdropping implementations, PD 520-B may wirelessly communicate to other PDs, e.g., PD 520-A, and may relay data to CD 510 via PD 520-A. Various other connection schemes and patterns may be devised that are within the scope of this disclosure.

Figure 6A:
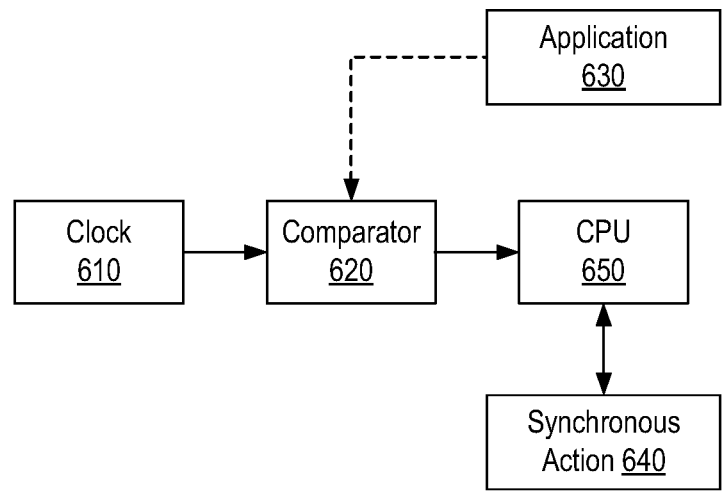
FIG. 6A and FIG. 6B depict example triggering schemes for initiating a synchronous event in a wireless network, in accordance with some implementations.
Figure 6B:
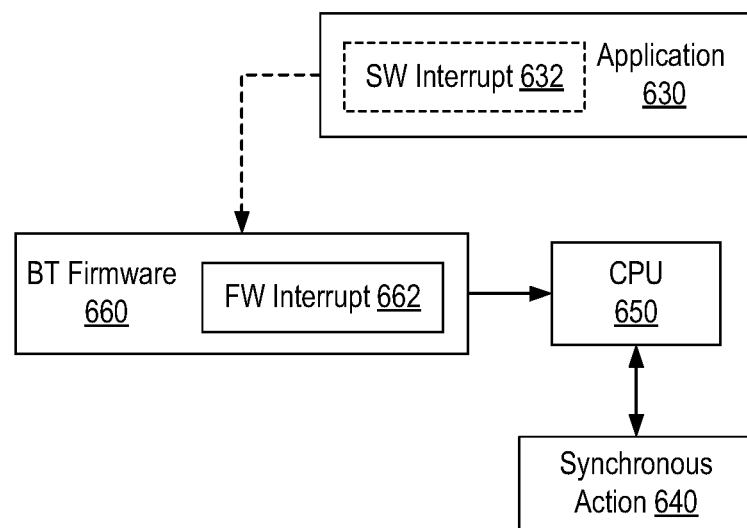

FIG. 6A and FIG. 6B depict example triggering schemes for initiating a synchronous event in a wireless network, in accordance with some implementations. Components (and operations thereof) illustrated in FIG. 6A and FIG. 6B may be implemented as part of a peripheral device of the wireless network. FIG. 6A illustrates a triggering scheme 600 that uses a hardware interrupt. After a message indicating a time of synchronous action is received by the PD from a CD, an application 630 instantiated on the PD may determine a future time of the synchronous action to be performed by the PD (e.g., as described in relation to FIGS. 1-5). Application 630 may configure a programmable comparator (e.g., a hardware comparator) 620 with the time of the synchronous action. The comparator 620 may be monitoring clock values output by a clock 610 of the PD, which may be synchronized with the clock of the CD (or other clocks in the network), e.g., using one of the methods described above. When the comparator 620 detects that the current clock value output by clock 610 matches (or exceeds) the time of the synchronous action (as programmed by application 630), comparator 620 outputs an interrupt signal to a central processing unit (CPU) 650 of the PD. The CPU 650 stops a current task being processed thereon and accesses a memory device (e.g., a register) with instructions that cause CPU 650 to perform a synchronous action 640 (e.g., to carry out measurements, initiate one or more operations, and so on) using the PD and/or one or more devices associated with the PD.

FIG. 6B illustrates a triggering scheme 602 that uses a firmware or a software interrupt. After a message indicating a time of synchronous action is received by the PD, application 630 instantiated on the PD may determine a time of the synchronous action and may configure a programmable firmware (FW) interrupt 662 within BT firmware 660. When BT firmware 660 determines that the time of the synchronous action has arrived, BT firmware 660 outputs an interrupt signal to CPU 650 and CPU 650 performs the synchronous action 640, as described above in relation to FIG. 6A. In some implementations, instead of programming FW interrupt 662, application 630 may program a software (SW) interrupt 632 (as depicted by the dashed box). At the time of the synchronous action, SW interrupt 632 outputs instructions to BT firmware 660 and BT firmware 660 communicates the interrupt signal to CPU 650.

FIGS. 7-10 are flow charts depicting example methods 700-1000 of performing synchronous actions by various devices connected via wireless networks. In some implementations, messages are communicated between at least some of the devices of the network in order to synchronize internal clocks of the respective devices. In some implementations, a CD sends messages that facilitate simultaneous performance of an action by multiple PDs. In some cases, the action may be to take a measurement or otherwise utilize some additional devices associated with the PDs, e.g., devices that communicate with the PDs (over a wired, wireless, optical, etc., connections) but do not communicate with the CD directly. In some implementations, some or all PDs may record a time stamp synchronously, and use the recorded time stamps to synchronize internal clocks and perform subsequent synchronous actions. In some implementations, there may be protection in any of the methods 700-1000 against data loss or other communication errors.

FIGS. 7-10 are not intended to limit the methods described therein to certain combinations, permutations, or assignment of actors, i.e. whether a PD or CD actually performs a particular operation. Rather, they are meant to be indicative of some implementations of this disclosure, and one skilled in the art will recognize that some operations may be rearranged for particular applications, some operations need not always be performed, some operations may be omitted, etc.

Figure 7:
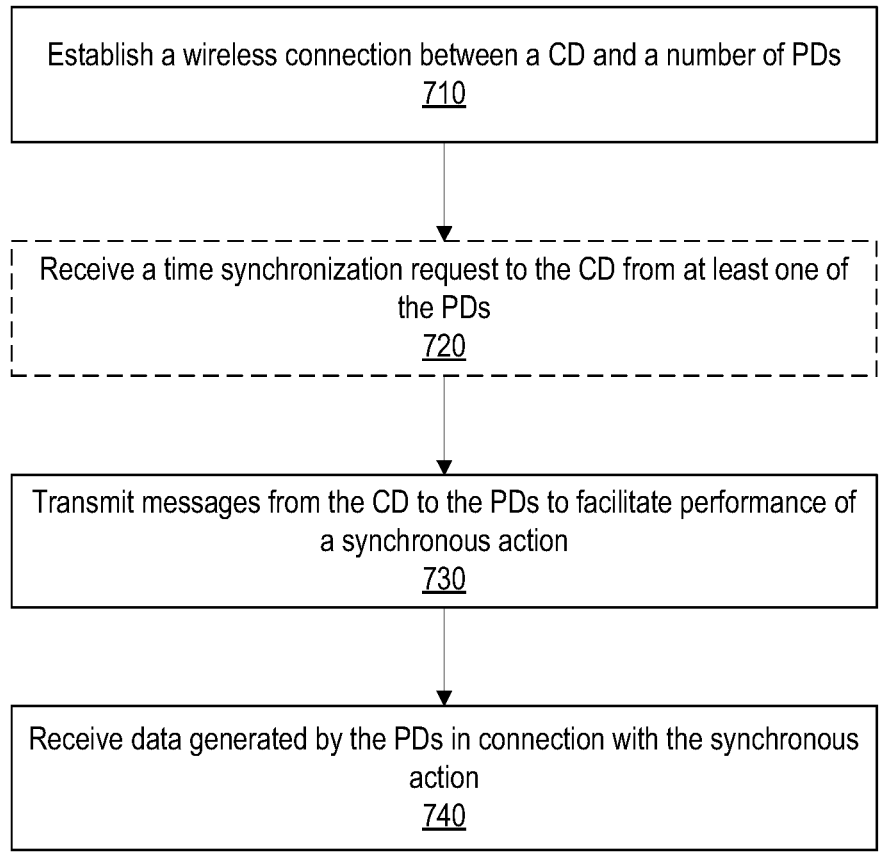
FIG. 7 is a flow diagram of an example method performed by a central device of a wireless network to facilitate a synchronous action by multiple peripheral devices of the wireless network, according to some implementations.

FIG. 7 is a flow diagram of an example method 700 performed by a central device of a wireless network to facilitate a synchronous action by multiple peripheral devices of the wireless network, according to some implementations. Method 700 may be used to bring the internal clocks of one or more PDs into agreement with the internal clock of the CD. Method 700 may also be used to facilitate the synchronous action by a number of devices associated with each of the PDs. At block 710, the CD establishes a wireless connection with a number of PDs. The established connection may use any suitable wireless communication protocol to support the wireless network. In some implementations, the wireless network may be a Bluetooth (BT) network or a Bluetooth Low Energy (BLE) network. Some or all PDs of the network may be communicatively coupled to at least one associated device, for example device(s) configured to take measurements or perform actions. For example associated devices may be configured to determine conditions or states of some other devices, which may be positioned in physically separate locations.

At block 720, the CD optionally (as indicated by the dashed outline of the block) receives a time synchronization request from at least one of the PDs. At block 730, the CD transmits one or more messages to the PDs. In those implementations where the CD received (at block 720) the time synchronization request(s), the messages transmitted at block 730 may be in response to receiving the request(s). The transmitted messages may include a time stamp associated with a reference time measured by the internal clock of the CD. The reference time may be associated with receiving, by the CD, of the time synchronization request from the respective PD (block 720). For example, the reference time may be the actual time of receiving the synchronization request, which may further be corrected by various delay times $t_1$, $t_2$, $t_3$, as described in conjunction with FIG. 1.

The messages transmitted at block 730 by the CD may facilitate performance of a synchronous action. The message may include an indication of time of the synchronous action. The indication may be a delay time from the time of the message to the time of the action. The indication may include, for instance, an event counter and a delay to be implemented after a target event counter is reached. Some or each of the PDs may receive an individualized indication of time. For example a first message transmitted for a first PD may include a first indication of time of the synchronous action (e.g., delay time $T_A$ 234 in FIG. 2). The first indication of time may be defined relative to a predefined first communication time for the first PD (e.g., the start of connection interval $T_0$, as depicted in FIG. 2). Similarly, a second message transmitted for a second PD may include a second indication of time of the synchronous action (e.g., delay time $T_B$ 236 in FIG. 2). The second indication of time may be defined relative to a predefined second communication time for the second PD (e.g., offset time B 232). More specifically, delay time $T_B$ 236 may be defined as a difference between the connection interval $T_0$ and offset time B 232 (optionally, with corrections, e.g., $t_1$, taken into account). The synchronous action may be an interaction of the PD with one or more associated devices, such as instructing a meter to take a measurement.

At block 740, the CD receives data transmitted by some or all of the PDs. The transmitted data may be generated in connection with the synchronous action performed by a respective PD or a device associated with the respective PD. For example, the transmitted data may include the results of the measurements performed by the PDs or by the devices associated with the PDs. The transmitted data may also include the time stamps recorded by the CPUs of the PDs, or other data related to the synchronous action.

Figure 8:
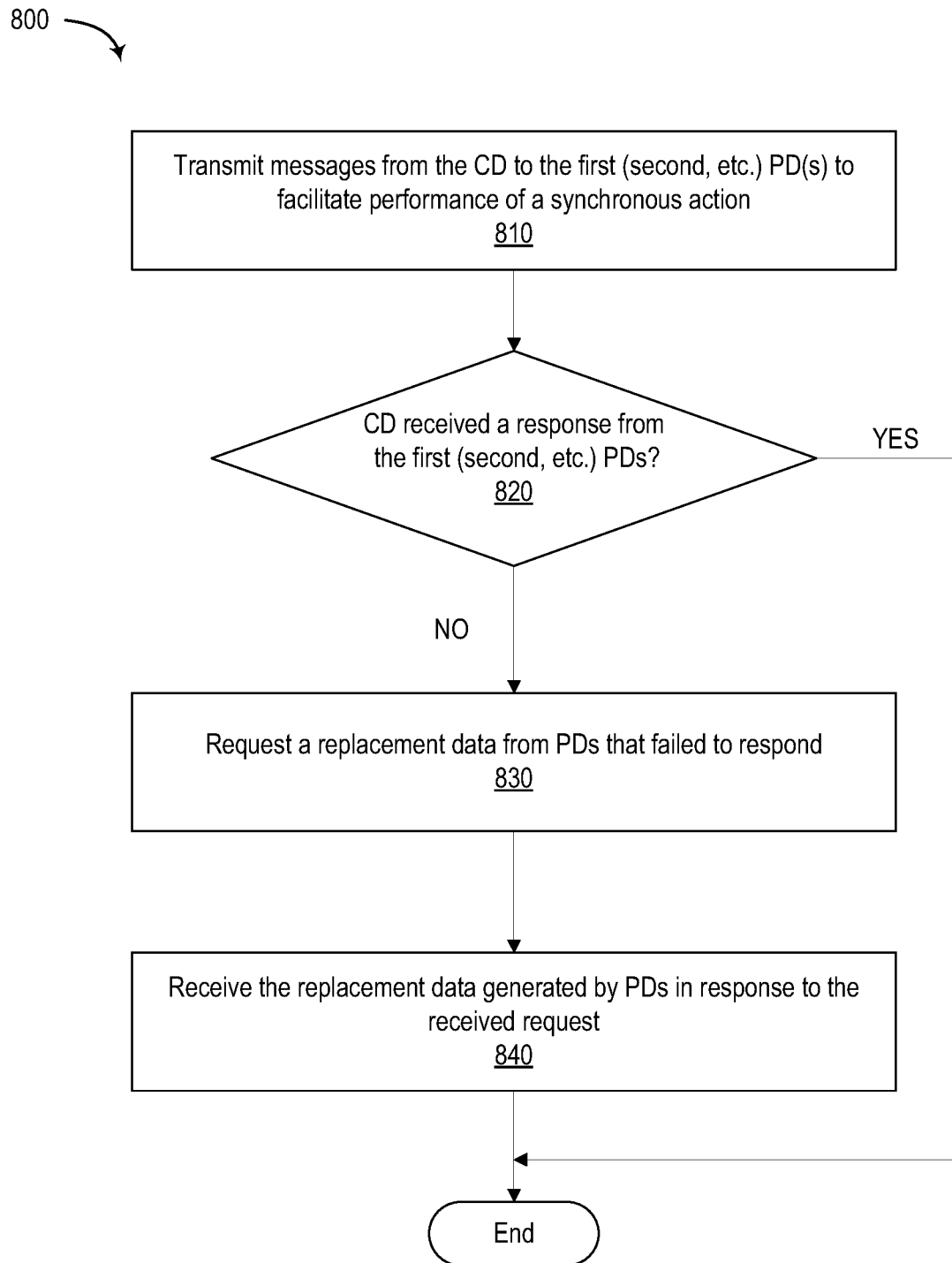
FIG. 8 is a flow diagram of an example method performed by a central device of a wireless network to facilitate a synchronous action by multiple peripheral devices, with additional protection against data loss, according to some implementations.

FIG. 8 is a flow diagram of an example method 800 performed by a central device of a wireless network to facilitate a synchronous action by multiple peripheral devices, with additional protection against data loss, according to some implementations. Method 800 of FIG. 8 (or similar methods) may be used with a number of implementations described above. At block 810, the CD transmits messages to one or more PDs to facilitate performance of a synchronous action. The messages may be transmitted during pre-scheduled connection events, such as BLE connection events. The CD may be broadcasting messages to be received by multiple PDs, or transmitting targeted communications to each individual PD, or performing a combination thereof. If the CD is broadcasting messages to all PDs, such messages may be advertising messages or other types of messages that include advertising frames. The messages may be or include BLE periodic advertisements. In the instances where the messages sent are advertising messages, the indication of time of a synchronous event may be common for all PDs. Facilitation of a synchronous event may take the form of a clock synchronization, relaying a delay time (with or without an event counter) to a particular time of the synchronous action, or may take any other suitable form. In the instances where the indication of time is a delay time, a sequence of messages may refer to the same synchronous action, with a second (third, etc.) indication of time adjusted (e.g., reduced) by the passage of time between the messages.

Some or all PDs may then perform the synchronous action, e.g., by performing measurements, initiating one or more operations, causing associated devices to perform measurements or to take one or more actions, or performing any number of other suitable synchronous operations. During performance of the synchronous action, a data may be generated that is associated with the synchronous action. For example, a state of each cell of a battery may be synchronously probed by PDs or devices associated with the PDs. Some or all PDs may communicate messages, which include data associated with the synchronous action, to the CD. At block 820, the CD may determine that the data from a first PD generated in connection with the synchronous action has not been received. At block 830, in response to not receiving the data, the CD may communicate a request for a replacement data from the first PDs. At block 840, the CD may receive the replacement data generated by the first PD in response to the received request.

Figure 9:
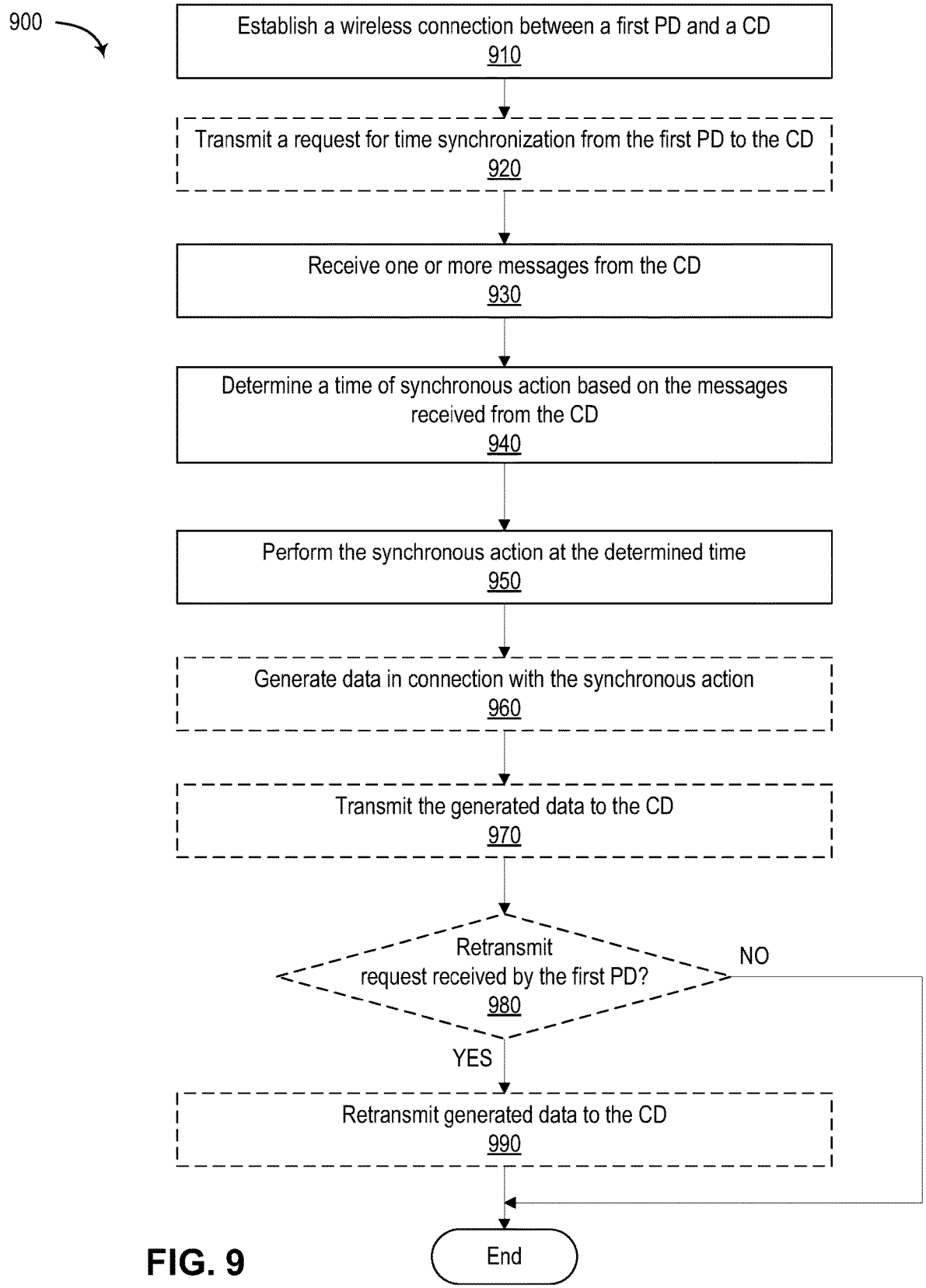
FIG. 9 is a flow diagram of an example method performed by a peripheral device of a wireless network to execute a synchronous action, according to some implementations.

FIG. 9 is a flow diagram of an example method 900 performed by a peripheral device of a wireless network to execute a synchronous action, according to some implementations. At block 910, a wireless connection between a PD (referred to herein as a first PD) and a CD is established. The established connection may be via any suitable wireless communication network. In some implementations, the wireless communication network may be a BT network or a BLE network. In some implementations, the first PD may have a two-way connection with the CD, e.g., a connection that allows the first PD to receive and transmit data to the CD. In some implementations, the first PD may have a connection with the CD that allows only to receive (e.g., listen but not transmit) data from the CD directed to a second (third, etc.) PD of the wireless network. More specifically, the first PD may be capable of eavesdropping on a two-way connection established between the second (third, etc.) PD and the CD. In other implementations, there may be no communication connections formed between the first (second, etc.) PDs and the CD, so that the CD may instead broadcast messages (e.g., BT advertising messages) intended to be received by multiple PDs. Each or some of the PDs may be communicatively coupled to one or more associated devices.

In some implementations, at block 920, the first PD may send a time synchronization request to the CD. In response to receiving the time synchronization request, the CD may generate and transmit one or more messages that may include a time stamp of a reference time measured by the CD's internal clock and associated with the time the CD received the time synchronization request. In some implementations, the time when the CD received the request may be adjusted by the time it took the CD to process the request, to create the time stamp, and by other possible delays.

At block 930, the first PD receives, from the CD, the one or more messages generated and transmitted by the CD in response to receiving the time synchronization request. At block 940, the first PD determines a time of the synchronous action, in view of the received messages. More specifically, the synchronous action may be an action to cause one or more devices associated with the first CD to perform some function (e.g., take a measurement or perform any other operation), record a time stamp for a subsequent communication to the CD (or to other PDs), and so on. In the implementations where the CD records a time stamp (e.g., upon a request from the first PD), the time of the synchronous action may be determined in view of the time stamp TS recorded by the CD and a connection interval (e.g., $T_O$) associated with a period of data exchange between the CD and the first PD, as described in more detail in conjunction with FIG. 1. At block 950, the synchronous action may be performed by the first PD. The synchronous action may be performed concurrently with various other PDs of the network performing similar (or individualized) actions. In some implementations, the CD may also perform a similar (or different) action at the same time. For example, the CD may likewise perform a measurement of a state of one or more cells of the battery. The synchronous action may include the first (second, etc.) PD interacting with one or more associated devices, such as measuring devices (e.g., sensors), actuators, processing devices, or any other suitable devices.

In some implementations, the first (second, etc.) PD (and, optionally, the CD) may generate data in connection with the synchronous action at block 960. At block 970, the first (second, etc.) PD may transmit the data generated in connection with the synchronous action to the CD, such as the data describing the measurement of the state of the devices associated with the first (second, etc.) PD.

The CD may not receive data from some or all of the PDs, for instance due to communication errors, interference, or the like. In some implementations, the CD may send a request to the PD(s) for a replacement data for the lost data. This request for the replacement data may be received by the first (second, etc.) PD at block 980. Upon receiving the request, the PD may transmit, at block 990, e.g., at the PD's next scheduled time to communicate with the CD, another data packet (or multiple data packets) that includes replacement data for the lost data.

Figure 10:
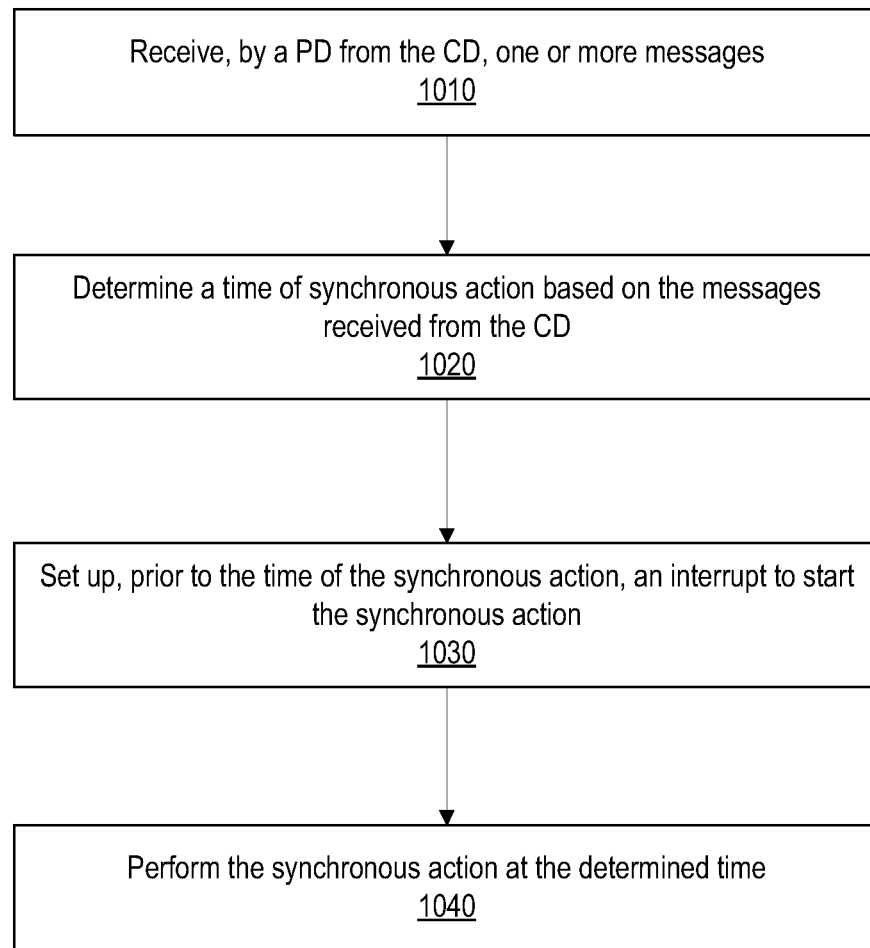
FIG. 10 is a flow diagram of an example method for a peripheral device to schedule performance of a synchronous action, according to some implementations.

FIG. 10 is a flow diagram of an example method 1000 for a peripheral device to schedule performance of a synchronous action, according to some implementations. At block 1010, a PD receives one or more messages. In view of the one or more received messages, the PD determines a future time of a synchronous action at block 1020, e.g., as described above in conjunction with FIGS. 1-5. The received messages may be of any suitable type that provide an indication of a synchronous action. At block 1030, the PD schedules the synchronous action by setting up an interrupt that starts the synchronous action. The interrupt may be set up at a predetermined time prior to the time of the synchronous action, to account for delays such as those discussed above in conjunction with FIG. 6. The length of these delays may have been empirically determined (e.g., measured or estimated previously), using any suitable method. The interrupt may be any one or more of a programmable software interrupt, a firmware interrupt, or a hardware interrupt. In some implementations, the hardware interrupt is caused by a special hardware block comparator detecting a clock value associated with the synchronous action and triggering the action when said clock value is detected. At block 1040, the synchronous action, triggered by the interrupt, is performed.

Figure 11:
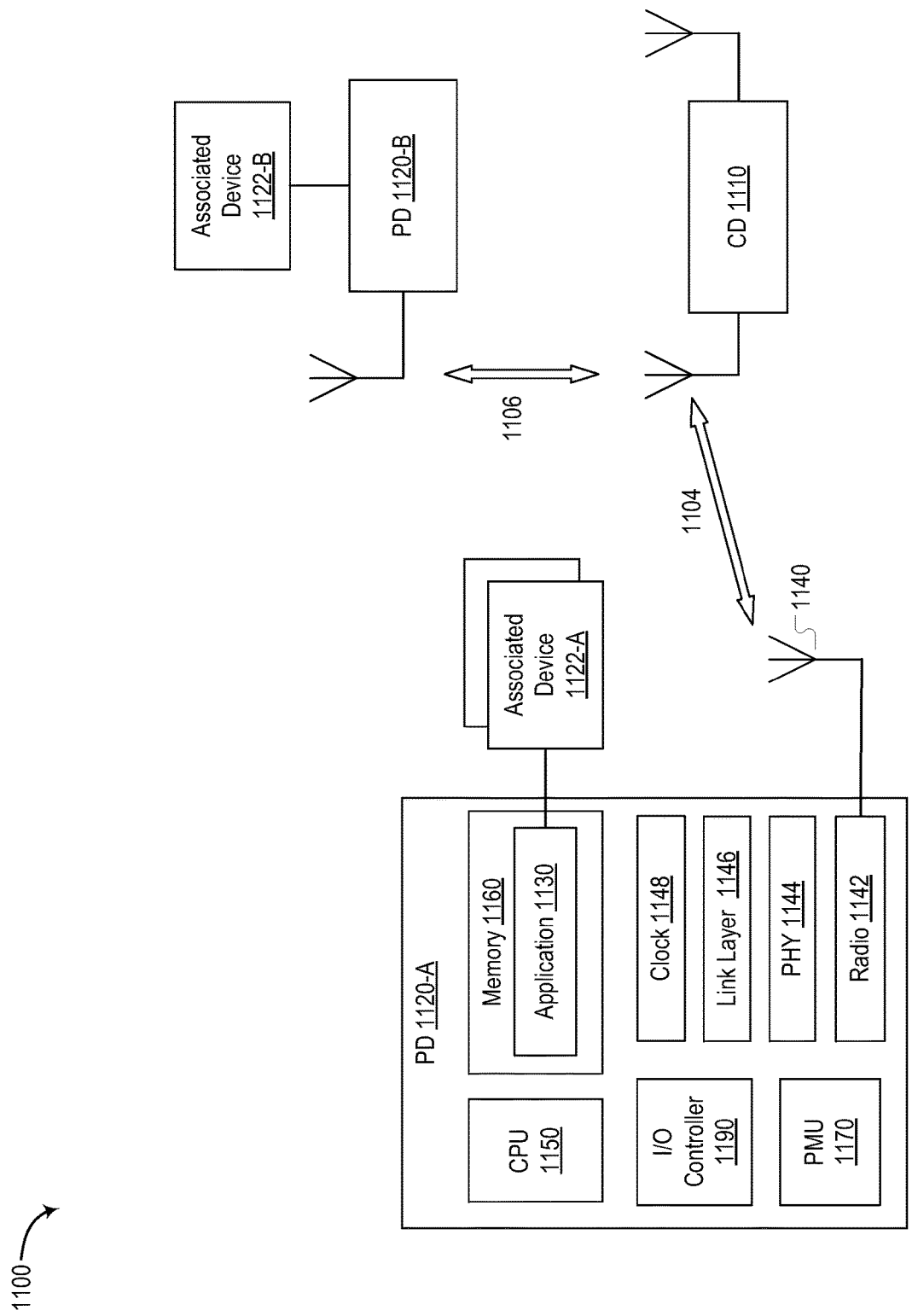
FIG. 11 is a diagram of a wireless network system in which time synchronization and synchronous actions may be performed, according to some implementations.

FIG. 11 is a diagram of a wireless network system 1100 in which time synchronization and synchronous actions may be performed, according to some implementations. Depicted is a CD 1110 that can support a wireless connection and data exchange with multiple PDs. Although two PDs 1120-A and 1120-B are shown for conciseness, wireless network system 1100 may include any number of PDs. Depicted are some components and modules of PD 1120-A, as discussed in more detail below. Although no internal structure is depicted for CD 1110 and PD 1120-B, it will be understood that some or all components of PD 1120-A may also be present in CD 1110, PD 1120-B, and other devices of the wireless network system 1100.

CD 1110 may establish wireless connections 1104 and 1106 with PDs 1120-A and 1120-B, respectively, as indicated schematically with the arrows. Wireless connections 1104 and 1106 may be BT connections, BTE connections, or any other suitable connections. Some or all PDs may be associated with one or more devices, e.g., PD 1120-A may be associated (and communicatively coupled) with one or more devices 1122-A and PD 1120-B may be associated with device B 1122-B, as shown by the respective solid lines in FIG. 11. In some implementations, one or more PDs, e.g., PD 1120-A and/or PD 1120-B, may transmit a time synchronization request to CD 1110. Similarly, CD 1110 may communicate one or more messages to PD 1120-A and/or PD 1120-B. Messages transmitted by CD 1110 may be in response to receiving the time synchronization requests from one or more PDs. The messages may be sent during separate connection events to each PD or may be broadcast to all (or a subset of) the PDs of the wireless network system 1100. In some implementations, CD 1110 may establish wireless connection 1106 with PD 1120-B and not establish a wireless connection 1104 with PD 1120-A; in such instances PD 1120-A may be eavesdropping on the wireless connection 1106. The messages may include a time stamp associated with a reference time measured by the clock of CD 1110. The reference time may be a time associated with CD 1110 receiving a time synchronization request from one or more PDs 1120-A and/or 1120-B. The messages from CD 1110 to the PDs may include indications of time of a future synchronous action. The indications of time may be common to some or all of the PDs of the wireless network system 1100, or may be generated for individual PDs (or groups of PDs), e.g., in view of the communication schedule for communication of CD 1110 with various PDs of the wireless network system 1100.

PD 1120-A (and, similarly, PD 1120-B or any other PD of the wireless network system 1100) may be any device supporting the network connectivity and functionality (e.g., receiving, sending, and relaying data), such as a desktop computer, a laptop computer, a tablet, a phone, a smart TV, a sensor, a lighting device, an electric battery, an electric generator, an appliance, a controller (e.g., an air conditioning, heating, water heating controller), a lock, a component of a security system, a location beacon, or any other type of network devices. PD 1120-A may support a synchronization application 1130, which may be a module (e.g., a software, firmware, hardware component, or any combination thereof) to perform time synchronization and facilitate synchronous action by PD 1120-A. In some implementations, synchronous action by PD 1120-A is performed simultaneously with actions by other devices (e.g., by other PDs and/or CD of the wireless network system 1100). In some implementations, synchronous action by PD 1120-A may be performed non-simultaneously with actions performed by other devices but according to a predetermined pattern. For example, PD 1120-A may perform an action at a first predetermined time, PD 1120-B may perform another (or a similar) action at a second predetermined time (which may be earlier or later than the first predetermined time), and so on. Synchronization application 1130 on PD 1120-A may operate in conjunction with (e.g., receiving instructions from and providing data to) a similar application instantiated on CD 1110. Synchronization application 1130 may be an industrial application, a vehicle application, a safety application, a measurement control application, a technical control and monitoring application, a smart home control application, a navigation application, a robotic application, and the like. Synchronization application 1130 may generate time synchronization requests to CD 1110, receive from CD 1110 and process indications of the times of the synchronous actions, cause the associated device(s) 1122-A to perform one or more operations in conjunction with the synchronous action, collect data from the associated device(s) 1122-A, process and communicate the collected data (including replacement data) to CD 1110, and so on.

PD 1120-A (and other PDs and CD) may be capable of a wireless connectivity at a single radio band (e.g., 2.4 GHz band, 5 GHz, 60 GHz, etc.) or multiple bands (e.g., both 2.4 GHz and 5 GHz bands). PD 1120-A may use (or be connected to) one or more antennas 1140, to receive and transmit radio waves. In some implementations, antenna(s) 1140 may be or include a single multi-input multi-output (MIMO). A signal received by antenna(s) 1140 may be processed by a radio component 1142, which may include filters (e.g., band-pass filters), low-noise radio-frequency amplifiers, down-conversion mixer(s), intermediate-frequency amplifiers, analog-to-digital converters, inverse Fourier transform modules, deparsing modules, interleavers, error correction modules, scramblers, and other (analog and/or digital) circuitry that may be used to process modulated signals received by antenna(s) 1140. Radio component 1142 may provide the received (and digitized) signals to a physical layer component (PHY) 1144. PHY 1144 may convert the digitized signals into frames that can be fed into a Link Layer 1146. Link Layer 1146 may have a number of states, such as advertising, scanning, initiating, connection, and standby. Link Layer 1146 may transform frames into data packets. During transmission, data processing may occur in the opposite direction, with Link Layer 1146 transforming data packets into frames that are transformed by PHY 1144 into digital signals provided to radio component 1142. Radio component 1142 may convert digital signals into radio signals and transmit the radio signals using antenna(s) 1140. In some implementations, radio component 1142, PHY 1144, and Link Layer 1146 may be implemented as parts of a wireless controller, e.g., a wireless controller implemented as a single integrated circuit.

PD 1120-A (or other PD and CD devices) may include one or more CPU 1150. In some implementations, CPU 1150 may include one or more finite state machines (FSMs), field-programmable gate arrays (FPGAs), application-specific integrated circuits (ASIC), or the like. PD 1120-A may have a single processor that executes various operations related to synchronization operations together with other processes that may be running on PD 1120-A. In some implementations, PD 1120-A may have a dedicated processor for synchronization operations that is separate from other processes and applications running on PD 1120-A. PD 1120-A may further include a memory device 1160, which may be (or include) non-volatile, e.g., read-only (ROM) memory, and volatile, e.g., random-access (RAM), memory. Memory device 1160 of PD 1120-A may also store codes and supporting data for synchronization application 1130.

PD 1120-A may further include a clock 1148 and power management unit (PMU) 1170, which may manage clock/reset and power resources. PD 1120-A may further contain an input/output (I/O) controller 1190 to enable communications with other external devices and structures, including associated device9s) 1122-A. In some implementations, I/O controller 1190 may enable a general purpose I/O (GPIO) interface, a USB interface, a PCM digital audio module, and other I/O components.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

The invention claimed is:

1. A method to perform a synchronous action in a wireless network, the method comprising:
    establishing a wireless connection between a central device (CD) of the wireless network and a plurality of peripheral devices (PDs) of the wireless network, wherein the wireless network is a Bluetooth (BT) wireless network or a Bluetooth Low Energy (BLE) wireless network, and wherein each of the PDs is communicatively coupled to one or more associated devices;
    transmitting, by the CD, one or more messages to each of the plurality of PDs to facilitate performance of the synchronous action comprising an interaction of each of the plurality of PDs with the respective one or more associated devices; and
    receiving, by the CD, a plurality of data, wherein each of the plurality of data is generated, in connection with the synchronous action performed by a respective PD of the plurality of PDs or a device associated with the respective PD.

2. The method of claim 1, wherein transmitting the one or more messages to each of the plurality of PDs is in response to receiving a time synchronization request from the respective PD, and wherein the one or more messages comprise a time stamp associated with a reference time, measured by a clock of the CD, associated with receiving, by the CD, of the time synchronization request from the respective PD.

3. The method of claim 1, wherein the one or more messages comprise:
    a first message for a first PD of the plurality of PDs, the first message comprising a first indication of time of the synchronous action, the first indication of time defined relative to a predefined first communication time for the first PD; and
    a second message for a second PD of the plurality of PDs, the second message comprising a second indication of time of the synchronous action, the second indication of time defined relative to a predefined second communication time for the second PD, the second communication time being different than the first communication time.

4. The method of claim 1, wherein the one or more messages transmitted to each of the plurality of PDs comprise at least a first indication of time of the synchronous action, wherein the first indication of time is generated by the CD for the respective PD.

5. The method of claim 4, wherein receiving the plurality of data comprises:
    in response to not receiving, by the CD, from a first PD of the plurality of PDs, a first data of the plurality of data generated in connection with the synchronous action, communicating to the first PD a request for the first data; and
    receiving, by the CD, from the first PD, a replacement data for the first data.

6. The method of claim 4, wherein the one or more messages transmitted to each of the plurality of PDs comprise a first advertising message, and wherein the first indication of time is common for the plurality of PDs.

7. The method of claim 6, wherein the one or more messages transmitted to each of the plurality of PDs further comprise a second advertising message having a second indication of time common for the plurality of PDs, and wherein the second advertising message is transmitted responsive to a passage of a predetermined time since transmission of the first advertising message, and wherein at least one of the first advertising message or the second advertising message comprises a periodic advertising packet.

8. The method of claim 1, wherein the interaction of each of the plurality of PDs with the respective one or more associated devices comprises performing a measurement of a state of at least some of the one or more associated devices.

9. The method of claim 1, wherein the synchronous action is scheduled by setting up, at a predetermined time prior to an onset of the synchronous action, an interrupt that starts the synchronous action, wherein the interrupt is at least one of:
   a programmable software interrupt;
   a firmware interrupt; or
   a hardware interrupt caused by a comparator detecting a clock value associated with the synchronous action.

10. A method to perform a synchronous action in a wireless network, the method comprising:
   establishing a wireless connection between a central device (CD) of the wireless network and a first peripheral device (PD) of a plurality of peripheral devices (PDs) of the wireless network, wherein the wireless network is a Bluetooth (BT) wireless network or a Bluetooth Low Energy (BLE) wireless network, and wherein each of the PDs is communicatively coupled to one or more associated devices;
   receiving, by the first PD, one or more messages from the CD;
   determining, by the first PD and in view of the one or more received messages, a time of the synchronous action of the plurality of PDs; and
   performing, by the first PD or a device associated by the first PD, the synchronous action at the determined time.

11. The method of claim 10, wherein the one or more messages comprise a time stamp associated with a reference time measured by a clock of the CD.

12. The method of claim 11, further comprising:
   transmitting, by the first PD, to the CD, a time synchronization request; and
   wherein the reference time is a time associated with receiving, by the CD, of the time synchronization request.

13. The method of claim 11, wherein the time of the synchronous action is determined in view of i) the time stamp and ii) a connection interval associated with a period of data exchange between the CD and the first PD.

14. The method of claim 10, wherein the one or more received messages comprise a first indication of time, generated by the CD for the first PD, of the synchronous action, the first indication of time being defined relative to a predefined first communication time for the first PD.

15. The method of claim 10, further comprising:
   transmitting, by the first PD to the CD, a first data generated in connection with the synchronous action.

16. The method of claim 15, further comprising:
   receiving, by the first PD, from the CD, a request for a replacement data for the first data, the received request indicative of the CD not receiving the first data; and
   transmitting, by the first PD, to the CD, a second data, wherein the second data is the replacement data for the first data.

17. The method of claim 10, wherein the one or more messages are directed by the CD to a second PD of the plurality of PDs, the second PD being different than the first PD.

18. The method of claim 10, wherein the one or more messages are transmitted to each of the plurality of PDs and comprise a first advertising message, the first advertising message comprising a first indication of time of the synchronous action.

19. The method of claim 18, wherein the one or more messages further comprise a second advertising message, the second advertising message comprising a second indication of time and transmitted responsive to a passage of a predetermined time since transmission of the first advertising message, and wherein at least one of the first advertising message or a the second advertising message comprises a periodic advertising packet.

20. The method of claim 10, wherein performing the synchronous action comprises measuring a state of the one or more associated devices communicatively coupled to the first PD.

21. The method of claim 10, wherein the synchronous action is scheduled by setting up, at a predetermined time prior to an onset of the synchronous action, an interrupt that starts the synchronous action, wherein the interrupt is at least one of:
   a programmable software interrupt;
   a firmware interrupt; or
   a hardware interrupt caused by a comparator detecting a clock value associated with the synchronous action.

22. A system comprising:
   a plurality of peripheral devices (PDs) of a wireless network, wherein the wireless network is a Bluetooth wireless network or a Bluetooth Low Energy wireless network; and
   a central device (CD) the wireless network, the CD to:
      establish a wireless connection between the CD and each of the plurality of PDs; and
      communicate one or more messages to each of the plurality of PDs; and wherein each PD of the plurality of PDs is to:
         determine, using the one or more messages communicated by the CD, a time of a synchronous action for the plurality of PDs;
         perform the synchronous action comprising an interaction of a respective PD with one or more associated devices communicatively coupled with the PD; and
         transmit a data generated by the respective PD or by the one or more associated devices in connection with the synchronous action.

23. The system of claim 22, wherein the CD is to communicate the one or more messages to each of the plurality of PDs in response to receiving a time synchronization request from the respective PD, and wherein the one or more messages comprise a time stamp associated with a reference time measured by a clock of the CD, the reference time being a time associated with receiving, by the CD, of the time synchronization request from the respective PD.

24. The system of claim 22, wherein the one or more messages transmitted by the CD comprise:
   a first message for a first PD of the plurality of PDs, the first message comprising a first indication of time of the synchronous action, the first indication of time defined relative to a predefined first communication time for the first PD; and
   a second message for a second PD of the plurality of PDs, the second message comprising a second indication of time of the synchronous action, the second indication of time defined relative to a predefined second communication time for the second PD, the second communication time being different than the first communication time.

* * * * *